April 5, 1960
A. STOLL
2,931,410
NUT LOCK WITH THREAD PORTIONS DEFORMED
UPON TIGHTENING OF THE NUT
Filed Dec. 21, 1956
2 Sheets-Sheet 2
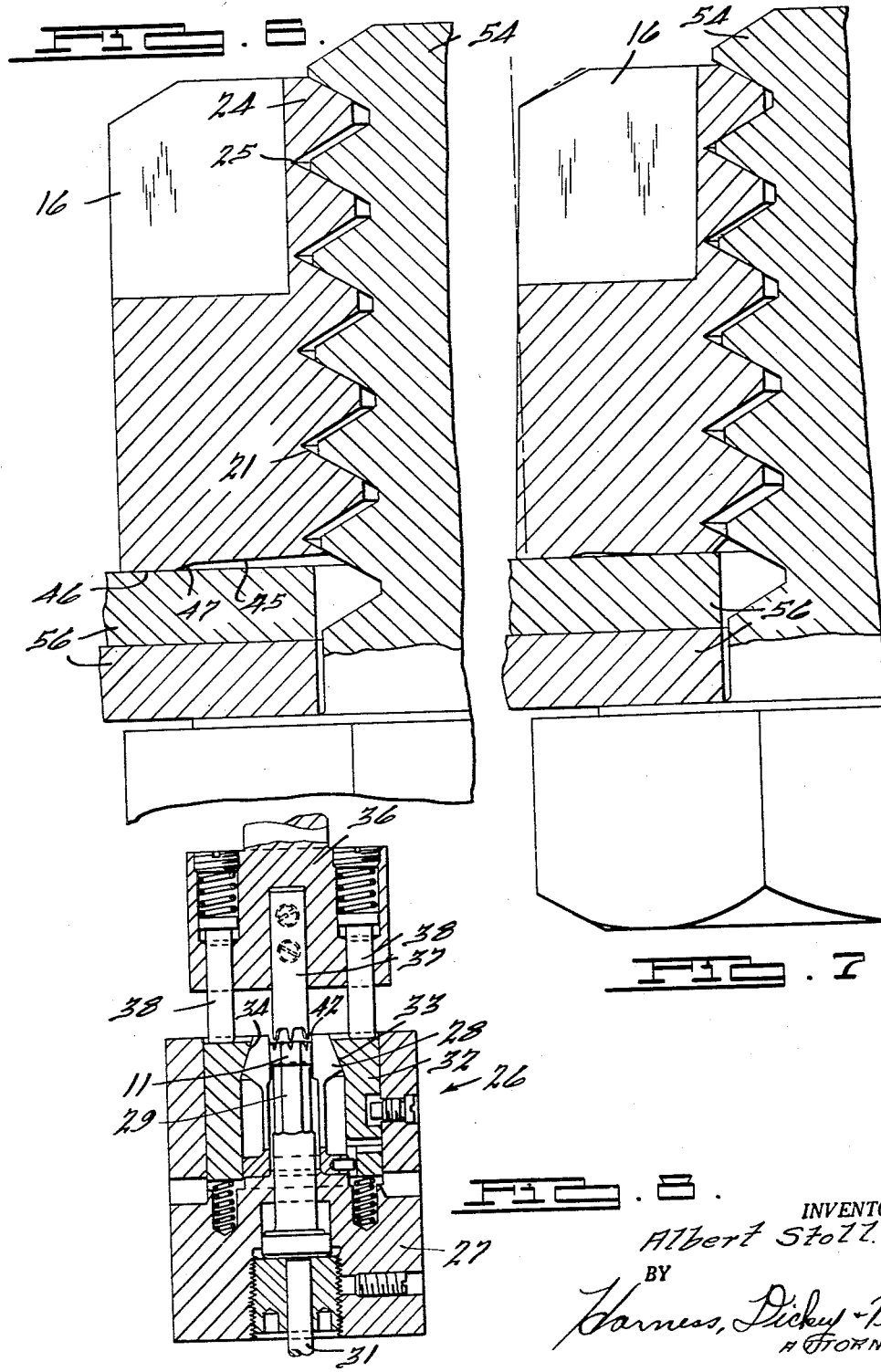
INVENTOR.
Albert Stoll.
BY
Harness, Dickey & Pierce
ATTORNEYS.

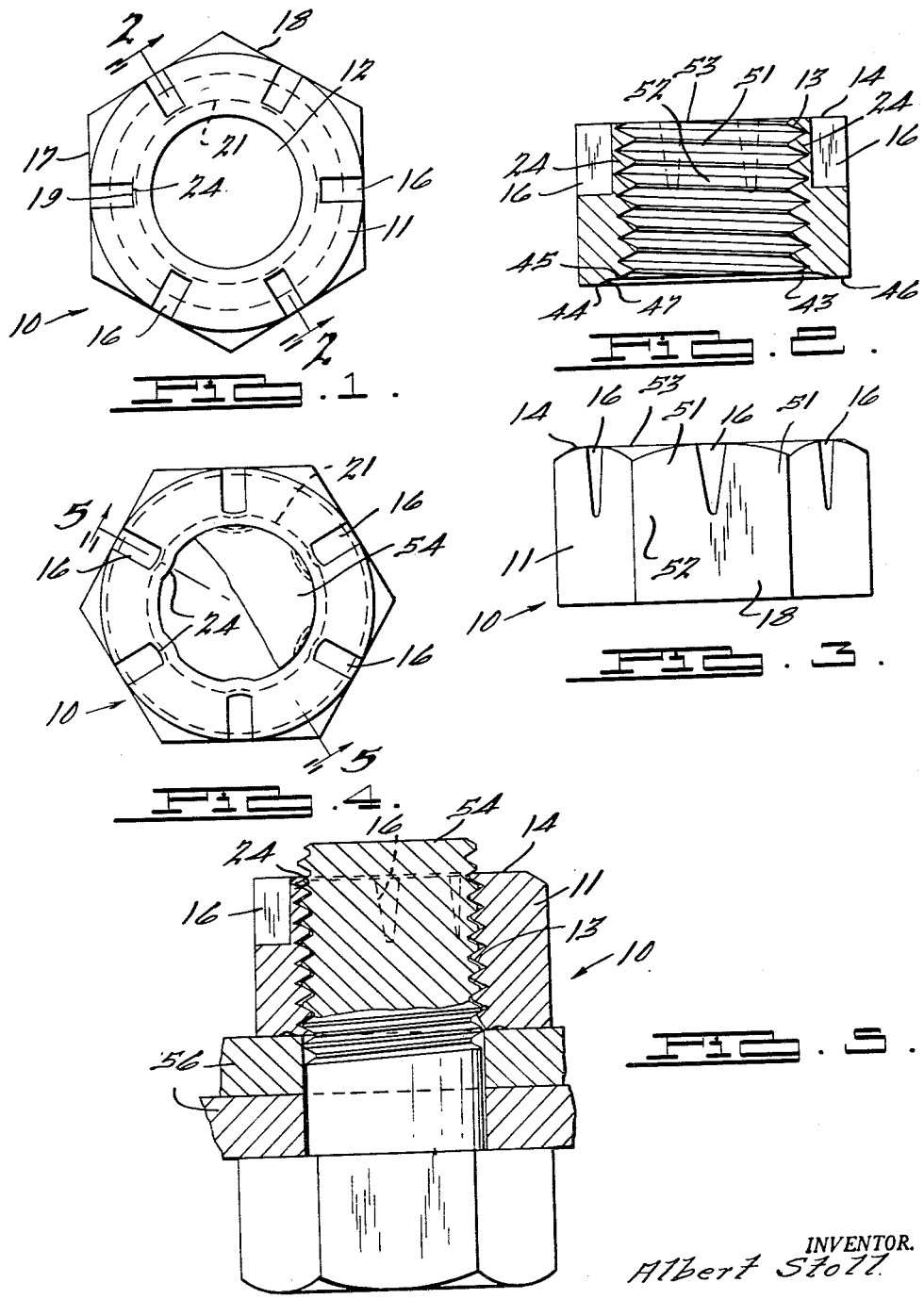

United States Patent Office 2,931,410
Patented Apr. 5, 1960

2,931,410

NUT LOCK WITH THREAD PORTIONS DEFORMED UPON TIGHTENING OF THE NUT

Albert Stoll, Detroit, Mich.

Application December 21, 1956, Serial No. 629,949

3 Claims. (Cl. 151—21)

This invention relates to lock nuts and the method of manufacturing the same and, more particularly, to an improved self-locking nut of the free-spinning, cantilever type and an improved method of manufacturing the same.

Heretofore, self-locking nuts of the above type have been provided with a plurality of circumferentially spaced fingers at one end. The fingers are formed by cutting a plurality of circumferentially spaced grooves in one end portion of the nut body, the grooves extending generally radially inwardly from the wrench faces of the nut body and intersecting the internally threaded bore of the nut. Prior self-locking nuts of the indicated character have been subject to the defect that free chips and loose burrs which result from the saw slotting and thread tapping operations become wedged in the parallel walled slots which are saw cut to form the prongs or fingers. These chips and burrs can free themselves through vibration and other forces after assembly to the workpiece, such as on a connecting rod cap and bolt and act in a damaging manner to the internal components of an assembly in motion. In addition, prior nuts of the indicated character have been subject to the defect that they do not provide a liquid-tight seal when mounted on a mating threaded member with the result that oil, grease or other fluid is free to travel along the threads of a mating bolt or stud on which the nut is assembled.

An object of the present invention is to overcome disadvantages in prior self-locking nuts of the indicated character and to provide an improved self-locking nut of the free-spinning, cantilever type and an improved method of manufacturing the same.

Another object of the invention is to provide an improved self-locking nut of the free-spinning, cantilever type incorporating improved means for preventing foreign matter from traveling between the fingers thereof and into the bore of the nut.

Another object of the invention is to provide an improved method of manufacturing self-locking nuts which enables the formation of a plurality of circumferentially spaced fingers and slots in the body portion of the nut without the formation of chips, burrs or the like.

Another object of the invention is to provide an improved self-locking nut incorporating improved means for effecting a fluid-tight seal between the thread of the nut and the thread of a mating threaded member when the nut is tightened home at assembly.

A further object of the invention is to provide an improved self-locking nut which is free spinning during assembly with a mating threaded member but which acquires prevailing torque locking values after the nut is tightened against an abutment surface.

Another object of the invention is to provide an improved self-locking nut of the free-spinning, cantilever type incorporating improved means for strengthening the nut and providing the nut with a maximum resistance to wrench twisting forces.

A further object of the invention is to provide an improved self-locking nut of the free-spinning, cantilever type incorporating improved means for limiting the gripping action of the nut and the deformation thereof when the nut is tightened home at assembly.

Still another object of the invention is to provide an improved self-locking nut which is rugged in construction, economical to manufacture, durable, and reliable in use over a prolonged service life.

Another object of this invention is to provide an improved self-locking nut incorporating improved means which strengthen the nut and which provide prongs which are narrower at their outer ends so that damage to the mating threads at this point or area due to poorly fitting socket wrenches on power driven wrenches is avoided.

The above as well as other objects and advantages of the present invention will become apparent from the following description, the appended claims, and the accompanying drawings, wherein:

Figure 1 is a top plan view of a self-locking nut embodying the present invention;

Fig. 2 is a transverse sectional view of the structure illustrated in Figure 1, taken on the line 2—2 thereof;

Fig. 3 is an elevational view of the self-locking nut illustrated in Figure 1;

Fig. 4 is a top plan view of the nut illustrated in Figure 1, showing the same applied to a bolt, portions of the bolt being removed for the purpose of better illustrating the nut construction;

Fig. 5 is a transverse sectional view of the structure illustrated in Fig. 4, taken on the line 5—5 thereof;

Fig. 6 is an enlarged fragmentary sectional view of a nut embodying the present invention, showing the same applied to a bolt and before the nut is tightened home against an abutment surface;

Fig. 7 is an enlarged fragmentary view of the structure illustrated in Fig. 6 and showing the nut after tightening home against an abutment surface; and Fig. 8 is a fragmentary vertical sectional view of apparatus which may be utilized in carrying out the method of the present invention.

Referring to the drawings, a self-locking nut, generally designated 10, is illustrated which embodies the present invention. The nut 10 includes a generally hexagonally-shaped body 11 provided with a centrally disposed, axially extending bore 12 having a conventional internal thread 13. It will be understood, however, that the body 11 may have any desired number of wrench flats. A plurality of equally angularly spaced, longitudinally tapered slots or grooves 16 are provided in one end portion 14 of the nut body 11, the grooves 16 extending radially inwardly from each wrench flat such as 17 and 18 of the nut body and terminating near, but spaced from, the bore 12 of the nut. The number of slots or grooves 16 preferably corresponds to the number of wrench flats or sides of the body 11, and the radially outer end of each slot or groove is preferably positioned midway of the associated wrench flat of the body. The radially outer end of each slot or groove 16 is open while the radially inner end 19 of each slot or groove 16 terminates in spaced relationship with respect to the central bore 12 so as to be in closely spaced relationship with the root 21 of the thread 13. By virtue of the close spacing of the inner end 19 of each slot 16 with the thread root 21, a thin web 24 is formed between each slot 16 and the central bore 12.

In manufacturing the nut, the slots 16 may be pressure formed in the nut body 11 before or after the bore 16 has been punched or drilled in the nut blank but prior to the cutting of the internal thread 13 in the bore. Thus, during the piercing of the bore, a supporting wall is provided which is of sufficient thickness to support the radial pressure of punching out or drilling the bore of the nut. Thereafter, the initially relatively stiff web is made sufficiently flexible to react to the cantilever action by making the radial dimension of the web relatively thin, the web being sufficiently weakened by the tapping operation so that the web will yield as required. At the same time, by maintaining an unbroken wall at the radially inner ends of the slots, such a construction prevents the formation and retention of tapping chips in the nut slots. By way of illustration, the radial dimension over the outside of the web may be from .001 to .010 of an inch greater than the maximum radial dimension over the tap crest.

Referring to Fig. 8, apparatus 26 for pressure forming the slots 16 is illustrated. The apparatus 26 includes an anvil body 27 which functions as a support for a nut holding collet 28 of radially yielding type having a central opening 42 and an upwardly and inwardly inclined upper surface portion 33. A lower punch tool 29, supported by the body 27, at a position within the collet 28, is arranged above a knock-out pin 31 which extends upwardly into the body 27. A sleeve 32 surrounding the collet 28 is provided with an inclined surface portion 34 positioned in engagement with the similarly inclined surface portion 33 at the upper end of the collet 28. A tool holding member 36 is provided which is positioned above the anvil body 27, the holding member 36 carrying a downwardly extending punch tool 37 which is shaped to form the slots 16 in the nut blank. The member 36 also carries a pair of vertically extending spring-biased pins 38.

In use, a suitable hopper and chute (not shown) direct the nut blanks into the apparatus 26. In Fig. 8, a nut blank 11 is shown positioned in the central collet opening 42 and supported by the tool 29. The tool holder 36 is then moved downwardly to forceably engage the tool 37 with the upper face of the nut blank 11. Concurrently, with the engagement of the tool 37 with the blank 11, the spring-biased pins 38 engage the upper surface of the sleeve 32 and act through the engaging inclined surfaces 33 and 34 on the sleeve 32 and collet 28 to press the collet 28 against the blank 11. As the slot formation tends to expand the nut blank 11, the outward pressure of the blank 11 against the collet 28 is balanced by the pressure of the spring-biased pins 38 against the sleeve 32. As a result, only a predetermined limited expansion of the blank 11 is permitted so as to guard against splitting or fracturing of the blank 11. Thus, when the slots 16 are formed in a nut blank by the apparatus 26, the blank spreads in a radial direction with the action of the pins 38 acting to yieldably resist excessive spreading of the nut blank. Concurrently, with the forming of the slots 16, the blank 11 is pressed downwardly against the punch 29 which is of a shape to form a central recess 43 in the lower or washer face 44 of the blank 11. As shown in Figs. 2 and 6, when the face 44 is formed with the recess 43, it has an inwardly inclined surface portion 45 encompassing the bore 12, a more steeply inclined portion 47 encompassing the portion 45, and an outer flat surface portion 46 encompassing the portion 47. The blank 11, after being formed with the slots 16 and the recess 43, is ejected from the collet 28 during upward movement of the punch tool 37 through the agency of the knock-out pin 31 acting against the work support punch 29.

Thus, on completion of the pressure forming operation with the apparatus 26, the end portion 14 of the nut blank 11 is provided with a plurality of circumferentially spaced slots 16 of a depth of preferably slightly less than one half the height of the nut. Concurrently, the end 44 of the nut blank 11 is provided with the centrally disposed recess 43. The blank 11 is then tapped to form the internal thread 13, the tapping operation controlling the thickness of the thin web portions 24 between the crests 25 of the tapped thread and the slots 16.

The slots 16 are formed in the blank 11 so as to provide the end portion 14 of the nut with a plurality of fingers, generally designated 51, the fingers corresponding in number to the number of slots 16. Each finger 51 tapers toward the free end thereof, the base portion 52 being thicker than the free end portion 53. The adjacent fingers 51 are, of course, connected by the relatively thin webs 24 previously described. The longitudinally tapering fingers and the relatively thin webs cooperate to strengthen the nut so that damage to the mating threads at the narrow outer end portions of the fingers due to poorly fitting socket wrenches on power driven wrenches is avoided. The tendency of the prior conventional prongs with parallel walls to twist and cant out of line and which, with a long arcuate contact at the outer ends of such prongs, tends to damage the threads, and the nut of the present invention avoids such damage by reducing the arcuate area of contact at the outer ends of the fingers and by providing a continuity of thread flank contact through the agency of the yielding web adjoining the bolt thread.

When the nut 10 is applied to a mating bolt 54 as shown in Figs. 5 and 7, and tightened home against a pair of plates 56 through which the bolt 54 extends, the nut 10 is tilted or canted radially inwardly about the bolt 54 until the inclined surface 45 at the inner end of the recess 43 is moved against the outer plate 56 as illustrated in Fig. 7. Such radial tilting or canting of the nut 10 reduces the diameter of the end portion 14 of the nut body 11. This reduction in the diameter causes an inward bulging of the webs 24, as illustrated in Fig. 4, with this bulging of the web portions 24 being sufficient to strain the webs beyond the elastic limit of the nut material. As a result, the webs 24 are permanently deformed or bulged inwardly. By virtue of this deformation of the webs 24, the webs 24 absorb a part of the cantilever effect and thereby prevent an excessive radial tilting of the fingers 51, the amount of tilting being only enough to equally distribute the nut friction generating pressure on the thread flanks of the nut and bolt. As a consequence, a concentration of pressure on a few inner nut threads is avoided even when a nut is overtightened.

By varying the thickness of the web 24 in accordance with the tensile strength of the nut material, a resilient lock nut is provided which is stronger than conventional nuts of this same general type since the degree of radial tilting of the nut is controlled. Such control is assured by the forming of the inclined recess surface 45 at a predetermined inclination to positively limit the radial tilting of the nut to the desired extent, namely, within the elastic limit of the nut material. As a result, when the nut 10 is removed from a bolt, stud or the like, the finger portions spring outwardly slightly so as to release the locking torque.

From the above description, it will be seen that the present invention provides a lock nut 10 of the free-spinning, cantilever type, the nut 10 including the outwardly tapered finger portions 51 which cooperate with the connecting webs 24 to resiliently grip a bolt or the like to which the nut is applied so as to insure a positive locking of the nut on the bolt when the nut is tightened home. By virtue of their tapered shapes, the fingers 51, on being radially tilted, do not bend abruptly at their junctures with the inner unslotted nut portion but instead are progressively tilted toward the free ends thereof. As a result, a sudden constriction of the thread pitch at the junctures of the fingers 51 and the unslotted body portion is avoided. Since the web portions 24 are bulged or bent inwardly, they cooperate with the fingers to increase the locking action and also function to seal the helical path of the nut and bolt threads so as to provide a fluid-tight seal along the helix of the thread to prevent the travel of fluid along the thread when the nut is tightened home on a mating bolt or the like. Moreover, since the grooves 16 are closed at their radially inner ends 19 by the webs 24, no communication of the slots 16 with the thread 13 is provided. As a result, any dirt or other foreign material in the slots or grooves 16 is prevented from traveling to a position within the bore of the nut 10.

Also, as previously pointed out, by virtue of the pressure forming operation of the slots 16, no chips, burrs or the like are formed in the manufacture of the nut, and the yielding web 24 prevents the entrance of tapping chips into the slots.

While a preferred embodiment of the invention has been shown and described, it will be understood that various changes and modifications may be made without departing from the spirit of the invention.

What is claimed is:

1. A self-locking nut comprising a body having an internally threaded bore adapted to be applied to a mating threaded member, the threads on said body being complementary to the portion of the thread of said mating threaded member adjacent an abutment surface, said body having a pair of end surfaces, one of said end surfaces having slots formed therein tapering toward the other end and extending for a distance equal to approximately one-half the axial length of said body, said slots extending generally radially inwardly of said body and being open at the radially outer ends thereof and terminating at the radially inner ends thereof in spaced relationship with respect to said bore so as to form a plurality of circumferentially spaced prongs interconnected by thin deformable webs between said slots and said bore, the other end surface of said body having at least its central portion recessed with respect to the outer peripheral portion thereof, said recessed other end surface and the portions of said body intermediate said slots causing said nut body to contract progressively from said other end and causing said webs to be forced radially inwardly of the bore defined by said body when said nut is applied to a mating threaded member and tightened home against an abutment surface.

2. The combination as set forth in claim 1 wherein the bore of said body is provided with a cylindrical thread having a uniform pitch diameter throughout the length thereof.

3. The combination as set forth in claim 1 wherein the radially inner portion of said recessed other end surface adjacent the internally threaded bore is located in a predetermined position and adapted to engage said abutment surface as said nut is tightened home to limit the contraction of said body.

References Cited in the file of this patent

UNITED STATES PATENTS

| | | |
|---|---|---|
| 1,734,445 | Place | Nov. 5, 1929 |
| 2,440,944 | Green | May 4, 1948 |
| 2,452,192 | Hosking | Oct. 26, 1948 |
| 2,495,409 | Costello | Jan. 24, 1950 |
| 2,546,332 | Costello | Mar. 27, 1951 |
| 2,592,128 | Engstrom | Apr. 8, 1952 |
| 2,592,129 | Engstrom | Apr. 8, 1952 |
| 2,679,879 | Engstrom | June 1, 1954 |

FOREIGN PATENTS

| | | |
|---|---|---|
| 2,562 | Great Britain | Feb. 1, 1907 |